US011838843B2

United States Patent
Bond et al.

(10) Patent No.: US 11,838,843 B2
(45) Date of Patent: Dec. 5, 2023

(54) SYSTEM FOR COMMUNICATING VEHICLE-SPECIFIC FEATURES OF AN INDIVIDUAL VEHICLE TO A PERSONAL ELECTRONIC DEVICE

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 17/573,007

(22) Filed: Jan. 11, 2022

(65) Prior Publication Data

US 2023/0224685 A1 Jul. 13, 2023

(51) Int. Cl.
*H04W 4/02* (2018.01)
*H04W 4/80* (2018.01)
*H04W 76/10* (2018.01)

(52) U.S. Cl.
CPC ............. *H04W 4/80* (2018.02); *H04W 4/023* (2013.01); *H04W 76/10* (2018.02)

(58) Field of Classification Search
CPC ........ H04W 4/80; H04W 4/023; H04W 76/10
See application file for complete search history.

(56) References Cited

U.S. PATENT DOCUMENTS 8,315,617 B2 * 11/2012 Tadayon ............... H04W 4/025
455/418
10,172,145 B2 * 1/2019 Hazebrouck ...... H04M 1/72415

* cited by examiner

*Primary Examiner* — Tuan H Nguyen
(74) *Attorney, Agent, or Firm* — Vivacqua Crane, PLLC

(57) ABSTRACT

A system for communicating vehicle-specific features to one or more personal electronic devices includes one or more controllers in wireless communication with a centralized computer system including one or more database for storing the vehicle-specific features. The one or more controllers execute instructions to undergo a passive wireless interaction with the one or more personal electronic devices. The passive wireless interaction involves determining the one or more personal electronic devices are located within a predefined proximity around a vehicle without human interaction. In response to undergoing the passive wireless interaction, the one or more controllers transmit one or more vehicle-specific features to the one or more personal electronic devices, where the one or more vehicle-specific features are unique to the vehicle.

20 Claims, 2 Drawing Sheets

SYSTEM FOR COMMUNICATING VEHICLE-SPECIFIC FEATURES OF AN INDIVIDUAL VEHICLE TO A PERSONAL ELECTRONIC DEVICE

INTRODUCTION

The present disclosure relates to a system for communicating vehicle-specific features to one or more personal electronic devices, where the vehicle-specific features indicate characteristics of an individual vehicle.

Vehicles are equipped with a number of different features and options. For example, a vehicle may be equipped one or more artificial intelligence systems to provide features such as, but not limited to, driver risk assessment, driver assistance, and automated driving systems. Furthermore, many vehicles today are equipped with a variety of human-machine interfaces (HMI) such as, for example, touchscreens, knobs, buttons, and speech recognition technology. However, a person may not be aware of the specific artificial intelligence systems and HMI devices that are included on a particular vehicle. It is to be appreciated that existing programs and websites exist that allow for an individual to enter a specific vehicle identification number (VIN) to learn about the specific features and options unique to a particular vehicle. However, it may be inconvenient for an individual to look up a VIN for a specific vehicle.

In addition to the above-mentioned challenges, some users may be apprehensive to use some artificial intelligence systems. This is because they believe that artificial intelligence systems collect data related to their own preferences and habits and then use the collected data for marketing purposes or to conduct intrusive digital marketing.

Thus, while current vehicles achieve their intended purpose, there is a need in the art for an approach that informs users of vehicle-specific features of an individual vehicle.

SUMMARY

According to several aspects, a system for communicating vehicle-specific features to one or more personal electronic devices is disclosed. The system includes one or more controllers in wireless communication with a centralized computer system including one or more database for storing the vehicle-specific features. The one or more controllers execute instructions to undergo a passive wireless interaction with the one or more personal electronic devices, where the passive wireless interaction involves determining the one or more personal electronic devices are located within a predefined proximity around a vehicle without human interaction. In response to undergoing the passive wireless interaction, the one or more controllers transmit one or more vehicle-specific features to the one or more personal electronic devices, where the one or more vehicle-specific features are unique to the vehicle.

In an aspect, the passive wireless interaction includes establishing wireless communication between the one or more controllers and the one or more personal electronic devices based on a short-range communications protocol.

In another aspect, the predefined proximity is a communication range of the short-range communications protocol that connects the one or more controllers and the one or more personal electronic devices to one another.

In still another aspect, the short-range communications protocol is set by the Institute of Electrical and Electronics Engineers, Inc. (IEEE) 802.xx standards.

In an aspect, the vehicle-specific features are unique to an individual vehicle associated with a vehicle identification number (VIN).

In another aspect, the passive wireless interaction includes sensing the vehicle and the one or more personal electronic devices are within the predefined proximity of one another based on proximity sensing.

In still another aspect, the proximity sensing includes receiving coordinates indicating a location of a personal electronic device, determining a distance between the personal electronic device and the vehicle based on the coordinates of the personal electronic device, and comparing the distance between the personal electronic device and the vehicle and the predefined proximity.

In an aspect, the vehicle-specific features one or more of the following: personal data capture and use, driving conditions, upcoming maneuvers, autonomous driving hardware health, sanitation status indicating cabin air quality, and available accessibility features.

In another aspect, the personal data capture and use includes information indicating where personal data associated with a specific user is stored and how the personal data is being disseminated.

In an aspect, a system for communicating vehicle-specific features is disclosed. The system includes one or more personal electronic devices in wireless communication with a centralized computer system including one or more databases for storing the vehicle-specific features. The one or more personal electronic devices each include one or more controllers executing instructions to undergo an active wireless interaction with one or more information transmission objects, where the active wireless interaction involves determining the one or more personal electronic devices are located within the predefined proximity around a vehicle based on a deliberate action by an individual. In response to undergoing the active wireless interaction, the centralized computer transmits one or more vehicle-specific features to the one or more personal electronic devices. The one or more vehicle-specific features are unique to the vehicle.

In an aspect, the deliberate action is an individual scanning a symbol by a camera of the one or more personal electronic devices.

In another aspect, the symbol is a specialized image that identifies the specific identity of the vehicle.

In yet another aspect, the symbol identifies a VIN associated with the vehicle.

In an aspect, the symbol is disposed along an exterior or interior surface of the vehicle.

In another aspect, the symbol is a decal disposed along a passenger window of the vehicle.

In yet another aspect, the symbol is displayed by a screen located within the interior cabin of the vehicle.

In an aspect, the deliberate action is placing the one or more personal electronic devices in proximity to an inductively coupled reader tag mounted on the vehicle to initiate a connection.

In another aspect, the vehicle-specific features one or more of the following: personal data capture and use, driving conditions, upcoming maneuvers, autonomous driving hardware health, sanitation status indicating cabin air quality, and available accessibility features.

In yet another aspect, the personal data capture and use includes information indicating where personal data associated with a specific user is stored and how the personal data is being disseminated.

In an aspect, the vehicle-specific features are unique to an individual vehicle associated with a VIN.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
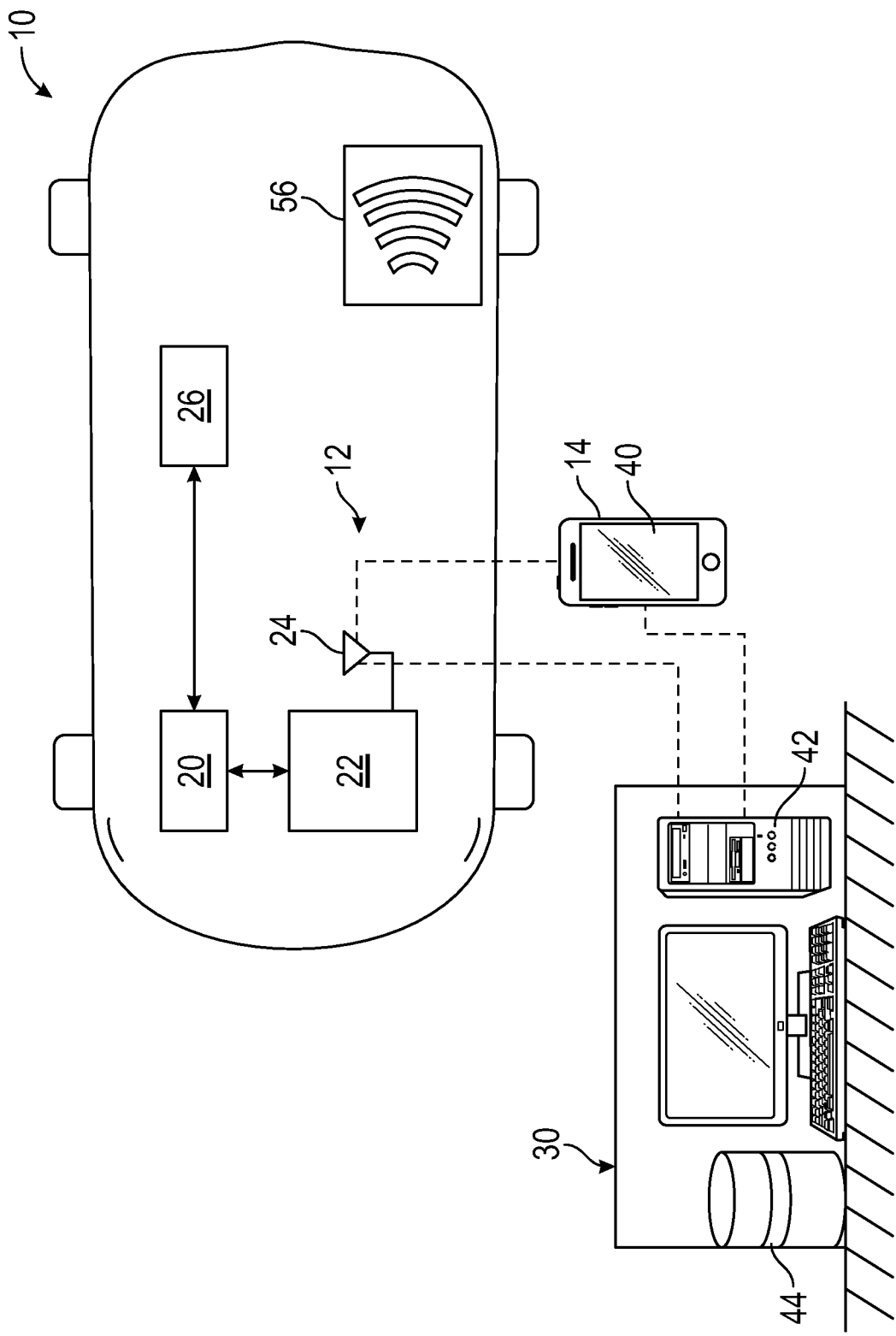
FIG. 1 is a schematic diagram of an exemplary vehicle including the disclosed system for communicating vehicle-specific features to one or more personal electronic devices, according to an exemplary embodiment.

Referring to FIG. 1, an exemplary vehicle 10 including the disclosed system 12 is shown. The system 12 communicates vehicle-specific features to one or more personal electronic devices 14 that are within a predefined proximity to the vehicle 10. The vehicle 10 may be any type of vehicle such as, but not limited to, a sedan, truck, sport utility vehicle, van, or motor home. In an embodiment, the vehicle 10 is an autonomous or semi-autonomous vehicle, however, it is to be appreciated that a vehicle manually driven by an individual may be used as well. As explained below, the vehicle-specific features are related to any feature applicable to the vehicle 10 such as, for example, driving conditions, upcoming maneuvers if the vehicle 10 is operating in an autonomous mode, or information related to how personal data is collected and disseminated. The disclosed system 12 includes one or more controllers 20 in electronic communication with one or more transceivers 22, an antenna 24, and one or more vehicle systems 26. The one or more transceivers 22 and antenna 24 wirelessly connect the one or more controllers 20 of the vehicle 10 with a back-office 30 as well as the personal electronic device 14.

As explained below, the system 12 transmits the vehicle-specific features in response to undergoing either a passive wireless interaction or an active wireless interaction with the personal electronic device 14. Specifically, a passive wireless interaction involves determining the personal electronic device 14 is located within the predefined proximity around the vehicle 10 without human interaction, and involves establishing wireless communication with the personal electronic device 14 based on a short-range communications protocol or, alternatively, by proximity sensing, which are both described below. In contrast, an active wireless interaction involves determining the personal electronic device 14 is located within the predefined proximity around the vehicle 10 based on a deliberate action by an individual. For example, as explained below, in an embodiment the active wireless interaction may involve an individual scanning a symbol 32 (seen in FIG. 2), where the symbol 32 is a specialized image that identifies the specific identity of the vehicle 10.

As also explained below, the vehicle-specific features may include information such as, but not limited to, personal data capture and use, driving conditions, upcoming maneuvers, autonomous driving hardware health, sanitation status indicating cabin air quality, and available accessibility features. It is to be appreciated that the vehicle-specific features are unique to the individual vehicle 10, and not to a particular model or type of vehicle. That is, in other words, the vehicle-specific features are unique to an individual vehicle associated with a vehicle identification number (VIN).

The personal electronic device 14 may be any type of communication device for transmitting and receiving data that includes one or more user interfaces 40 for conveying information to a user. In the example as shown in FIG. 1, the user interface 40 is a touchscreen, however, it is to be appreciated that other devices may be used as well such as, for example, a speaker. For example, the personal electronic device 14 may be a smartphone or laptop computer. The one or more vehicle system 24 may be any vehicle system or subsystem for communicating information related to operation of the vehicle 10 to the one or more controllers 20 such as, for example, artificial intelligence systems, automated driving systems such as advanced driver-assistance systems (ADAS), a heating, ventilation, and air conditioning (HVAC) system, propulsion system, energy storage system, or driver monitoring system.

The passive wireless interaction with the personal electronic device 14 shall now be described. Specifically, in an embodiment, the passive wireless interaction includes establishing wireless communication between the one or more controllers 20 of the vehicle 10 and the personal electronic device 14 based on a short-range communications protocol. The wireless communication is established when the personal electronic device 14 is within the predefined proximity around the vehicle 10. In an embodiment, the predefined proximity is the communication range of a specific short-range communications protocol that connects the one or more controllers 20 of the vehicle 10 and the personal electronic device 14 to one another. In one non-limiting embodiment, the short-range communications protocol is set by the Institute of Electrical and Electronics Engineers, Inc. (IEEE) 802.xx standards.

In one example, the short-range communications protocol is a wireless local area network (wireless LAN, also referred to as Wi-Fi or the IEEE 802.11 standard) and the communication range is about forty-five meters to about ninety meters, depending upon the environment. Thus, the predefined proximity is about forty-five meters to about ninety meters, depending upon the environment. In another example, the short-range communications protocol is based on IEEE 802.15.1, and the communication range is about ten meters.

In response to determining the short-range wireless communication is established between the one or more controllers 20 of the vehicle 10 and the personal electronic device 14, the one or more controllers 20 of the system 12 retrieve the vehicle-specific features indicating the characteristics of the vehicle 10 from one or more centralized computers 42 that are part of the back-end office 30. As seen in FIG. 1, the centralized computers 42 include one or more databases 44 for storing the vehicle-specific features indicating the characteristics of the vehicle 10.

The vehicle-specific features indicating the characteristics of the vehicle 10 are then transmitted to the personal electronic device 14. In response to receiving the vehicle-specific features, the personal electronic device 14 conveys the vehicle-specific features by the user interface 40. For example, in an embodiment, if the user interface 40 is a touchscreen, then the personal electronic device 14 conveys the vehicle-specific features by displaying information related to the vehicle-specific features on the touchscreen. Alternatively, in another example, the user interface 40 may be a speaker or other audio device for conveying the vehicle-specific features by sound.

In another embodiment, the passive wireless interaction includes sensing the one or more controllers 20 of the vehicle 10 and the personal electronic device 14 are within the predefined proximity of one another based on proximity sensing. In proximity sensing, the one or more controllers 20 receive coordinates indicating a location of the personal electronic device 14. For example, in an embodiment, the coordinates indicating the location of the personal electronic device 14 are global navigation satellite system (GNSS) coordinates. The one or more controllers 20 determine a distance between the personal electronic device 14 and the vehicle 10 based on the coordinates of the personal electronic device 14 and compare the distance between the personal electronic device 14 and the vehicle 10 and the predefined proximity. In the present example, instead of being based on a specific short-range communications protocol, the predefined proximity simply indicates the personal electronic device 14 is within a predefined distance range of the vehicle 10. In response to determining the distance between the personal electronic device 14 and the vehicle 10 is equal to or less than the predefined proximity, the one or more controllers 20 retrieve the vehicle-specific features indicating the characteristics of the vehicle 10 from one or more centralized computers 42 that are part of the back-end office 30.

Figure 3:
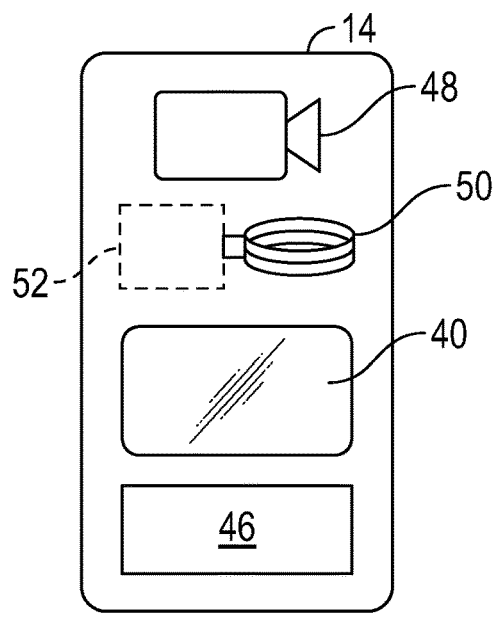
FIG. 3 is a schematic diagram of the personal electronic device, according to an exemplary embodiment.

The active wireless interaction with the personal electronic device 14 shall now be described. Specifically, the active wireless interaction includes determining the personal electronic device 14 is within the predefined proximity of the vehicle 10 in response to detecting a deliberate action performed by an individual. FIG. 3 is a schematic diagram of the personal electronic device 14 including the user interface 40, one or more controllers 46, a camera 48, one or more antennas 50, and communication circuitry 52 coupled to the antenna 50 for inductive coupling communication. The one or more controllers 46 of the personal electronic device 14 are in electronic communication with the user interface 40, the camera 48, and the communication circuitry 52.

Figure 2:
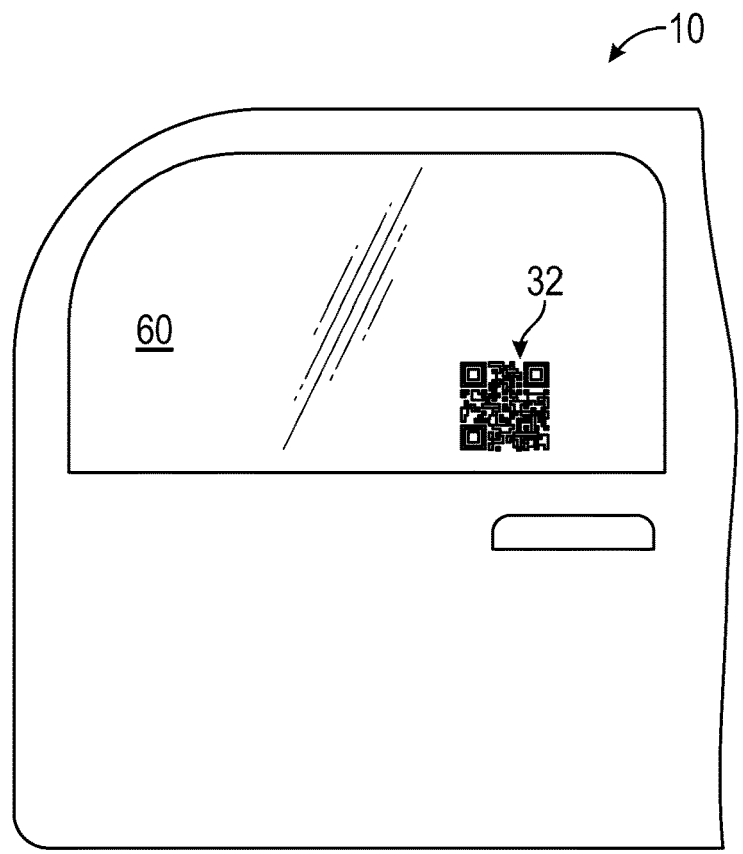
FIG. 2 illustrates an exemplary symbol that is a quick response (QR) code disposed on a window of the vehicle, according to an exemplary embodiment.

Referring to FIGS. 1-3, in an embodiment the deliberate action is an individual scanning the symbol 32 by the camera 48 of the personal electronic device 14. The one or more controllers 46 of the personal electronic device 14 undergoes the active wireless interaction with one or more information transmission objects. In an embodiment, the one or more information transmission objects include the symbol 32, where the symbol 32 is a specialized image that identifies the specific identity of the vehicle 10. Specifically, the symbol 32 identifies a VIN associated with the vehicle 10. In the non-limiting embodiment as shown in FIG. 2, the symbol 32 is a quick response (QR) code disposed along a passenger window 60 of the vehicle 10, however, FIG. 2 is merely exemplary in nature and the symbol 32 is not limited to a QR code. In another example, the symbol 32 may be another customized barcode or image that is scannable by the camera of the personal electronic device 14 such as, but not limited to, an augmented reality University of Cordoba (ArUco) code. Although FIG. 2 also illustrates the symbol 32 as a decal disposed along a passenger window 60 of the vehicle 10, it is to be appreciated that the symbol 32 is disposed along any exterior or interior surface of the vehicle 10 as well. Moreover, although FIG. 2 illustrates the symbol 32 as being printed on a sticker or decal, in another embodiment the symbol 32 is displayed by a screen located within the interior cabin of the vehicle 10. Specifically, during vehicle start-up, the one or more controllers 20 instruct a screen to display the symbol 32.

The camera 48 of the personal electronic device 14 sends image data representative of the symbol 32 to the one or more controllers 46 of the personal electronic device 14. The one or more controllers 46 of the personal electronic device 14 decodes the symbol 32 the specific identity of the vehicle 10, and then retrieves the vehicle-specific features indicating the characteristics of the vehicle 10 from the centralized computers 42 that are part of the back-end office 30. The vehicle-specific features indicating the characteristics of the vehicle 10 are then conveyed to a user by the one or more user interfaces 40. For example, the vehicle-specific features may be shown upon a touchscreen or display.

Continuing to refer to FIGS. 1-3, in another embodiment the one or more information transmission objects include an inductively coupled reader tag 56 mounted on the vehicle 10, and the deliberate action is an individual placing the personal electronic device 14 in proximity to an inductively coupled reader tag 56 mounted on the vehicle 10 to initiate a connection. Specifically, the communication circuitry 52 that is part of the personal electronic device 14 acts as an energy supply to provide power to the inductively coupled reader tag 56 when the personal electronic device 14 is placed within proximity of the inductively coupled reader tag 56.

The vehicle-specific features shall now be described. In an embodiment, the personal data capture and use includes information indicating where personal data associated with a specific user is stored and how the personal data is being disseminated. For example, personal data may be used for training purposes, to conduct research, or for digital marketing. Personal data may be any type of information relating to how the user operates the vehicle 10 such as, but not limited to, driving behaviors, infotainment use, information related to paired devices, audio use, and video use. The driving conditions indicate factors such as, for example, vehicle speed and direction. In the event the vehicle 10 is an autonomous or semi-autonomous vehicle, then one or more upcoming maneuvers include items such as, for example, a deceleration or an upcoming right turn. The autonomous driving hardware health may indicate if one or more autonomous sensors that are part of the vehicle 10 such as, for example, a camera or radar are experiencing issues. The sanitation status indicating cabin air quality. More specifically, in an embodiment, cabin air quality refers to a last time an HVAC unit was sanitized to remove bacteria and germs. Finally, the available accessibility features refer to technology that may assist a user when operating a vehicle. For example, available accessibility features may support blind or vision-impaired individuals, hard of hearing or deaf individuals, individuals with motor or speech impediments, and individuals with cognitive impairments. One example of an accessibility feature is specialized knobs or a special touchscreen to accommodate an individual with unsteady or shaky hands. Another example of an accessibility feature is the ability to stream audio directly into an individual's hearing aid.

Referring generally to the figures, the disclosed system provides various technical effects and benefits by informing a user of one or more vehicle-specific features indicating characteristics of an individual vehicle with only minimal effort required by an individual. Existing websites allow for an individual to enter a specific VIN to learn about the specific features and options, however, many individuals find it cumbersome to do so. Moreover, the disclosed system also provides an approach for informing a user where his or her personal data is being stored, as well as how the personal data is being disseminated. Indeed, some users may be apprehensive to use some artificial intelligence systems in vehicle, as they believe artificial intelligence systems collect data related to their own preferences and habits in order to conduct intrusive digital marketing. The disclosed system may enhance transparency and trust by informing users where and how personal data is stored and used.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for communicating vehicle-specific features to one or more personal electronic devices, the system comprising:
    one or more controllers in wireless communication with a centralized computer system including one or more database for storing the vehicle-specific features, the one or more controllers executing instructions to:
    undergo a passive wireless interaction with the one or more personal electronic devices, wherein the passive wireless interaction involves determining the one or more personal electronic devices are located within a predefined proximity around a vehicle without human interaction; and
    in response to undergoing the passive wireless interaction, transmit one or more vehicle-specific features indicating one or more characteristics of the vehicle to the one or more personal electronic devices, wherein the one or more vehicle-specific features are unique to the vehicle, and wherein the vehicle-specific features are one or more of the following: personal data capture and use, driving conditions, upcoming maneuvers, autonomous driving hardware health, sanitation status indicating cabin air quality, and available accessibility features.

2. The system of claim 1, wherein the passive wireless interaction includes establishing wireless communication between the one or more controllers and the one or more personal electronic devices based on a short-range communications protocol.

3. The system of claim 2, wherein the predefined proximity is a communication range of the short-range communications protocol that connects the one or more controllers and the one or more personal electronic devices to one another.

4. The system of claim 2, wherein the short-range communications protocol is set by the Institute of Electrical and Electronics Engineers, Inc. (IEEE) 802.xx standards.

5. The system of claim 1, wherein the vehicle-specific features are unique to an individual vehicle associated with a vehicle identification number (VIN).

6. The system of claim 1, wherein the passive wireless interaction includes sensing the vehicle and the one or more personal electronic devices are within the predefined proximity of one another based on proximity sensing.

7. The system of claim 1, wherein the proximity sensing includes:
    receiving coordinates indicating a location of a personal electronic device;
    determining a distance between the personal electronic device and the vehicle based on the coordinates of the personal electronic device; and
    comparing the distance between the personal electronic device and the vehicle and the predefined proximity.

8. The system of claim 7, wherein the coordinates indicating the location of the personal electronic device are global navigation satellite system (GNSS) coordinates.

9. The system of claim 1, wherein the personal data capture and use includes information indicating where personal data associated with a specific user is stored and how the personal data is being disseminated.

10. The system of claim 1, wherein each of the one or more personal electronic devices are one of the following: a smartphone and laptop computer.

11. A system for communicating vehicle-specific features, the system comprising:
    one or more personal electronic devices in wireless communication with a centralized computer system including one or more databases for storing the vehicle-specific features, wherein the one or more personal electronic devices each include one or more controllers executing instructions to:
    undergo an active wireless interaction with one or more information transmission objects, wherein the active wireless interaction involves determining the one or more personal electronic devices are located within Mena predefined proximity around a vehicle based on a deliberate action by an individual; and
    in response to undergoing the active wireless interaction, the centralized computer system transmits one or more vehicle-specific features indicating one or more characteristics of the vehicle to the one or more personal electronic devices, wherein the one or more vehicle-specific features are unique to the vehicle, and wherein the vehicle-specific features are one or more of the following: personal data capture and use, driving conditions, upcoming maneuvers, autonomous driving hardware health, sanitation status indicating cabin air quality, and available accessibility features.

12. The system of claim 11, wherein the deliberate action is an individual scanning a symbol by a camera of the one or more personal electronic devices.

13. The system of claim 12, wherein the symbol is a specialized image that identifies the specific identity of the vehicle.

14. The system of claim 12, wherein the symbol identifies a VIN associated with the vehicle.

15. The system of claim 12, wherein the symbol is disposed along an exterior or interior surface of the vehicle.

16. The system of claim 12, wherein the symbol is a decal disposed along a passenger window of the vehicle.

17. The system of claim 12, wherein the symbol is displayed by a screen located within an interior cabin of the vehicle.

18. The system of claim 11, wherein the deliberate action is placing the one or more personal electronic devices in proximity to an inductively coupled reader tag mounted on the vehicle to initiate a connection.

19. The system of claim 11, wherein the personal data capture and use includes information indicating where personal data associated with a specific user is stored and how the personal data is being disseminated.

20. The system of claim 11, wherein the vehicle-specific features are unique to an individual vehicle associated with a VIN.

\* \* \* \* \*